Patented Aug. 31, 1926.

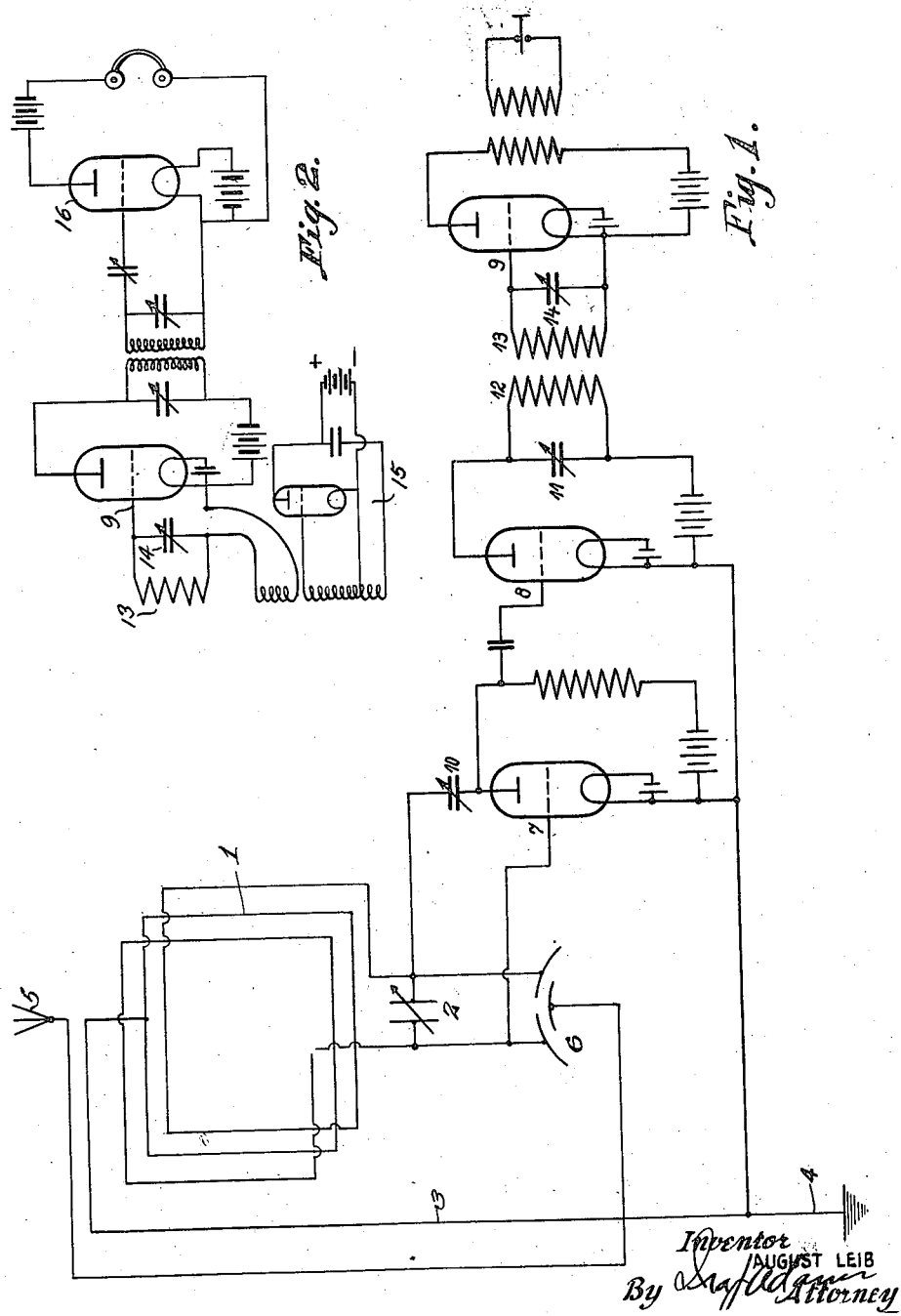

1,598,144

UNITED STATES PATENT OFFICE.

AUGUST LEIB, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

RADIO RECEIVING APPARATUS.

Application filed May 3, 1922, Serial No. 558,308, and in Germany April 8, 1921.

My present invention relates to an arrangement of a frame receiver by which the direction of the transmitting station can be determined with great exactness from the magnetic field of the incoming high frequency oscillations.

In the use of the well known method of determining the direction of a transmitter, the frame antenna is adjusted to the position of minimum audibility, the plane of the antenna frame in such position having the direction of the magnetic field of the incoming oscillations. In other words, the plane of the antenna frame in the position of minumum audibility is at right angles to the direction of the transmitter from the antenna. If goniometer direction-finders are used, an amplified coupling field is generated in the known manner either by means of a ring-shaped coil or of crossed coils as in the Bellini-Tosi direction finders. The amplified field of these coils contains a movable coil which is employed for determining the direction in the same way as the movable frame antennæ.

If the plane of the antenna frame, in the case of a movable antenna, or the movable coil, in the case of a Bellini-Tosi direction finder, lies exactly at right angles to the direction of the transmitting station in the position of minimum audibility, the direction-finder is called right-pointing and in the opposite case wrong-pointing, that is, the deviations from accurate or right-pointing. The wrong-pointings may be divided into those which are based upon the reflection or deflection of the waves on the way from the transmitting station to the receiving station and those which are due to local causes. Whilst the former can not be prevented, the latter must be done away with by the construction as well as possible. These latter can again be divided into two groups, namely, those which always remain constant and those which do not. The constant wrong-pointings can easily be compensated for by appropriate calibration of the direction finder, but the inconstant wrong-pointings which are dependent on the operator and on local variations of the magnetic and electric field cannot be so corrected.

The arrangements previously known have shown very great wrong-pointings, the cause of which has been solely explained by the reflection and deflection of the radiated oscillations on the way to the receiving station. At times the wrong-pointings have been more than 30° so that the direction finders have been of no use. The wrong-pointings of the direction-finders in use are caused almost solely by local conditions and can be explained by the coupling of the different coils and oscillatory circuits of the receiver and of the magnetic field of the incoming oscillations. The electromotive forces which are produced in this field influence the minimum which enables the direction to be found. Besides, the couplings of the coils and circuits of the receiver cause phase-displacements in comparison with the incoming oscillations and together with these displacements very great and inconstant faults. The faults are not controllable, as they are dependent on the adjustment of the apparatus.

This difficulty is overcome by my present invention. One single oscillatory circuit with one single winding system is employed for receiving the oscillations, for furnishing a coupling with the magnetic field and a coupling with the detectors or valves, and finally it is employed for regenerative reaction and compensation of the electrostatic charges. The total winding of the system consists of a movable frame-antenna by which all influences are obviated which can be the causes of wrong-pointings. These are impossible even if the apparatus is inaccurately adjusted by which the sharpness of the minimum is altered but not the direction of the frame. Besides this, according to the present invention, all regulations are made by condensers, including the regulation of the syntonization as well as that of the regenerative coupling and that of the electrostatic compensating means so that all additional coils which might be the cause of wrong-pointings are avoided.

As already indicated wrong-pointings are always obtained if loose couplings of further circuits which are tuned to the incoming high frequency oscillations are employed in order to improve the selectivity. In case the selectivity of the simple receiving circuit, which is required for a right-pointing direction finder, is not sufficient, the high frequency according to a further feature of the invention is converted into an intermediate frequency or into a low frequency by means of a detector or an audion-valve and loosely coupled circuits which are tuned to the intermediate frequency or to the low frequency are inserted. These circuits have no influence on the determination of the direction as they are very much detuned with respect to the incoming high frequency oscillations and withdraw practically no energy from the magnetic field.

In the drawing, Fig. 1 represents a circuit arrangement embodying the invention, and Fig. 2 represents a modified form of the arrangement.

The illustrated arrangement comprises a movable frame antenna 1 which together with the condenser 2 forms the only oscillatory circuit which is tuned to the incoming oscillations. The middle of the self-inductance 1 is, by means of the conductor 3, either directly earthed or connected to the batteries of the tubes. These batteries can also be connected to earth by a conductor 4. These connecting wires have the purpose of leading to the earth the energies which are furnished by the electric field of the transmitting station. When the plane of the frame is at right angles to the direction of the sending station, the energies received in the antenna from the sender have opposite directions in the two halves of the frame, and, therefore, compensate each other. 5 is a small aerial which can be connected to one or the other side of the oscillatory circuit by means of the condenser 6. The aerial 5 and condenser 6 may be adjusted to balance out any energy that may not be completely compensated in the antenna frame. 7, 8, and 9 denote cathode-tubes; 7 being a high frequency amplifier tube, 8 an audion-tube and 9 either an intermediate frequency amplifier tube or a low frequency amplifier tube. Of course, several tubes of every kind are connected in a cascade arrangement and furthermore the intermediate frequency amplification and the low frequency amplification can be simultaneously connected in series. In the latter case a loose coupling can, of course, be connected to the intermediate frequency as well as to the low frequency in order to avoid the well-known troubles which often arise from close coupling. As shown, the high frequency amplifier tube 7 is connected to the self inductance 1 according to the three-point back-coupling arrangement. With this arrangement, one part of the self inductance 1 is inserted in the grid circuit of the cathode tube and the other part in the anode circuit of the same tube. The condenser 10 regulates the regenerative coupling reaction. A tuned circuit comprising the capacity 11 and the self inductance 12 is included in the anode circuit of the tube 8. This circuit may be tuned either to an intermediate frequency or to a low frequency, and the circuit 13, 14 may be tuned to the same frequency. Moreover, both of such circuits may be loosely coupled.

The circuits 11, 12 and 13, 14 are preferably used for an intermediate frequency selectivity if a damped transmitter is received. In this case the acoustic frequency of the anode circuit of the tube 8 does not pass the coupling 12, 13 but firstly an auxiliary oscillation must be generated in the circuit 1, 2 by means of the coupling reaction, and the beat note which is produced by the incoming wave and by the auxiliary wave must be adjusted in such a way, that it corresponds to the syntonization of the circuits 11, 12 and 13, 14. When continuous waves are received, the signals become audible only after a special heterodyne generator 15, Fig. 2, produces an auxiliary oscillation which furnishes a beat note together with the oscillation of the circuit 13, 14. In the last-mentioned case, the tube 9 may be preceded in the system by one or more amplifiers (not shown) and is followed by a detector circuit 16.

Having described my invention, what I claim is:

1. In a radio receiving system for directional indication the combination of a rotatable loop aerial, a direct coupled receiving circuit, a three-element valve connected thereto for regenerative reception, the winding system of said loop aerial being connected to form the inductance of the receiving and regenerative circuits, a balancing aerial and a variable condenser for tuning the receiving circuit, a second variable condenser for controlling the back coupling of the regenerative circuit and a balancing condenser for coupling the balancing aerial to the loop aerial.

2. In a radio receiving system for directional indication the combination of a rotatable loop aerial, a variable condenser connected in parallel thereto, a ground connection to an intermediate point of said loop aerial, a second variable condenser, and a three-element valve having its grid electrode connected to one end of the coil and its anode connected to the other end of the coil through said second variable condenser for controlling the back coupling between the grid and anode circuits.

3. In a radio receiving system for directional indication the combination of a rotatable loop aerial, a variable condenser connected in parallel thereto, a ground connection to an intermediate point of said loop aerial, a second variable condenser, a three-element valve having its grid electrode connected to one end of the coil and its anode connected to the other end of the coil through the second condenser for controlling the back coupling between the grid and anode circuits, a balancing aerial and a condenser for coupling the balancing aerial to the loop aerial.

4. In a radio receiving system for directional indication the combination of a rotatable loop aerial, a variable condenser connected in parallel thereto, a ground connection to an intermediate point of said loop aerial, a second variable condenser, a three-element valve having its grid electrode connected to one end of the coil and its anode connected to the other end of the coil through the second condenser for controlling the back coupling between the grid and anode circuits, and loose coupled selective circuits following said valve circuits.

5. In a radio receiving system for directional indication the combination of a rotatable loop aerial, a variable condenser for tuning the loop circuit, a three-element valve, connections between said valve and said loop aerial for providing direct coupled regenerative circuits, a balancing aerial and a condenser for coupling the balancing aerial to the loop aerial.

6. In a radio receiving system for directional indication the combination of a rotatable loop aerial, a variable condenser for tuning the loop circuit, a three-element valve, connections between said valve and said coil for providing direct coupled regenerative receiving circuits, a variable condenser connected to the anode circuit of the valve for controlling the back coupling, a balancing aerial, a condenser for coupling the balancing aerial to the loop aerial, and a ground connection to an intermediate point of the coil.

7. In a receiving system for directional indication the combination of a rotatable loop aerial, a variable condenser in parallel with said loop to form a circuit for tuning to the received oscillations, a relay having its input circuit connected across a portion of said loop between an end and an intermediate point, the output circuit being connected across the remainder of the loop, a variable condenser connected in the output circuit for controlling the regeneration, a balancing aerial, a variable balancing condenser for coupling the balancing aerial to the loop aerial and a ground connection to the said intermediate point of the loop.

In testimony whereof I affix my signature.

AUGUST LEIB.